Figure 1:
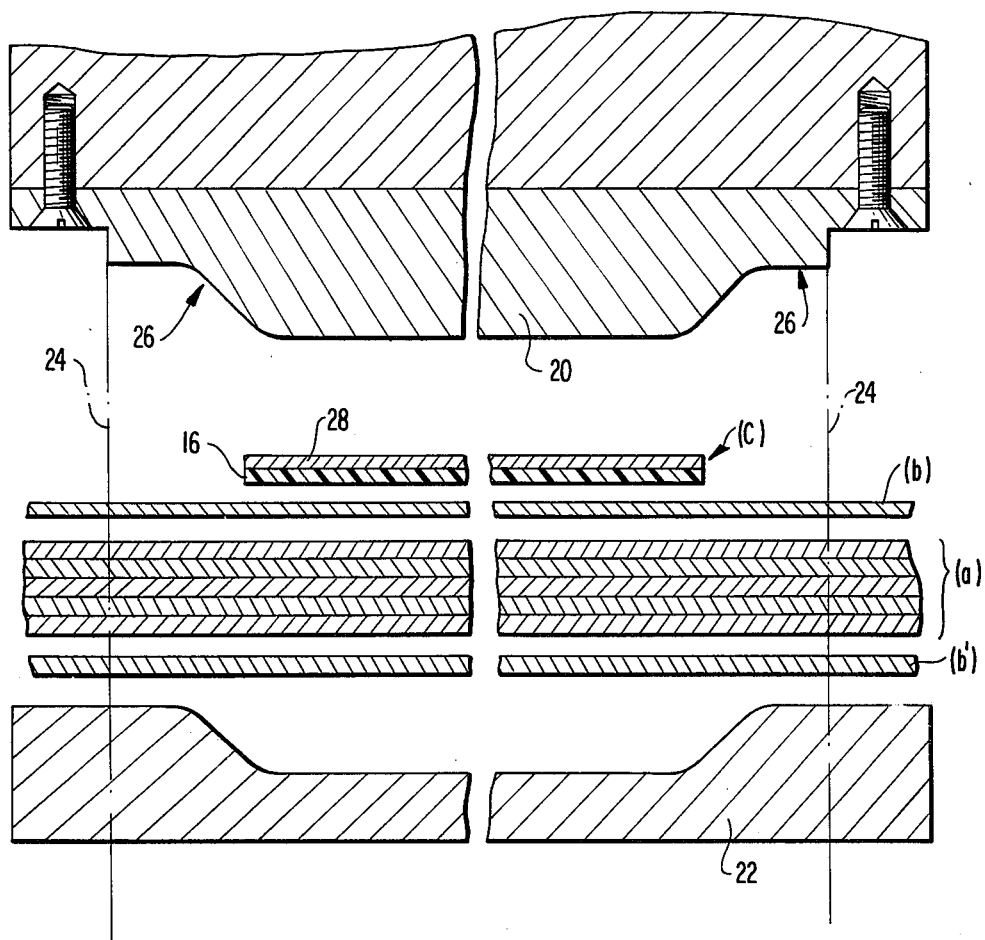

United States Patent [19]

Polzin

[11] 4,145,240

[45] Mar. 20, 1979

[54] PROCESS FOR THE MANUFACTURE OF AN ARTICLE OF LAMINATED PLASTICS HAVING IMPROVED SURFACE CHARACTERISTICS

[75] Inventor: Renée Polzin, Pregassona, Switzerland

[73] Assignee: Plama Plastic Metallic Limited, St. Peter Port, Channel Islands

[21] Appl. No.: 822,171

[22] Filed: Aug. 5, 1977

[30] Foreign Application Priority Data

Aug. 5, 1976 [CH] Switzerland ............... 9975/76

[51] Int. Cl.$^2$ ............................................. B32B 25/06
[52] U.S. Cl. ............................. 156/230; 156/224; 156/246
[58] Field of Search ............... 156/224, 221, 222, 212, 156/214, 333, 246, 230, 235, 249; 428/501, 502, 503, 514, 522

[56] References Cited

U.S. PATENT DOCUMENTS

| 2,382,004 | 8/1945 | Curran | 156/224 |
| 2,801,198 | 7/1957 | Morris et al. | 156/224 X |
| 2,854,425 | 9/1958 | Boger et al. | 260/33.6 |

OTHER PUBLICATIONS

Rubber Technology, 2nd ed., M. Morton ed., 1973, TS 1890, M66r, pp. 337–348.

*Primary Examiner*—William A. Powell
*Assistant Examiner*—William H. Thrower
*Attorney, Agent, or Firm*—Sughrue, Rothwell, Mion, Zinn and Macpeak

[57] ABSTRACT

A process for the manufacture of an article such as a tray made of laminated plastics having a non-slippery surface comprises the steps of forming on a temporary flexible support a vulcanizable coating comprising a mixture of 100 parts of crude polyethylene chlorosulphonate rubber with a 3–50 parts by weight of heat-hardenable melamine resin, forming of a pack of:
 (a) a core for the laminate,
 (b) at least one sheet of melamine impregnated paper or melamine impregnated fabric, heat-hardenable on one face of the core (a),
 (c) the said temporary support with the said vulcanizable layer being in contact with the component (b); and pressing the pack at 125–155° C. to simultaneously vulcanize the rubber, harden the resin and combine the components into a monolithic laminated structure.

11 Claims, 2 Drawing Figures

PROCESS FOR THE MANUFACTURE OF AN ARTICLE OF LAMINATED PLASTICS HAVING IMPROVED SURFACE CHARACTERISTICS

The present invention relates to the manufacture of articles of laminated plastics, in the form of sheets or of finished articles such as for example trays.

Normally, the surface of an article of laminated plastics is formed of heat-hardened melamine/formaldeyde resin, deriving from the use, as the external layer of the laminate, of board or canvas impregnated with such a resin. A surface of this type is generally hard, vitreous, slippery and cold to the touch. Although these properties are desirable for many applications, there are many cases in which these properties are undesirable or indeed unacceptable. For example, for covering wall surfaces or for the manufacture of furniture it would be preferable to have sheets of plastics material of opaque or semi-opaque surface, with a warm and soft feel. Similarly, for example, the problem of producing a tray of laminated plastics or a service table (for example, for hospitals) made of plastic laminates which have a nonslippery surface has been recognised for some time. It is likewise known that the solutions of this problem hitherto investigated have proved to be practically useless for commerical purposes. Thus, for example, in French Pat. Nos. 1,187,246 and 2,169,009 as well as in German utility model 1,988,323, laminated plastics article have been suggested (particularly trays) in which the external surfaces are formed by a very thin layer of polyvinyl chloride (PVC), preferably containing a high percentage of plasticiser. In practice, however, when a tray of this type is subjected to washing with hot water (about 80° C.) and to sterilisation by steam, the PVC layer embrittles, cracks and becomes detached from the tray. In German Patent Application DT-OS 2,320,769 there is proposed, for the non-slip layer, thermoplastic polyurethane foams. In practice, however, a non-slip layer of foam progressively fills with dirt and becomes impregnated with foul smelling substances or substances which grow rancid in time, which no washing is capable of eliminating.

Moreover, when a layer of foam is stuck onto the support by means of a hardening liquid adhesive, which under the sticking pressure; fills up the pores of the foam, the absorption of dirt or foul smelling substances by a layer is in general virtually prevented, but likewise its non-slip properties are impaired in an unacceptable manner. Finally, experimental work has been carried out on various types of elastomers for use as non-slip layers, amongst which are for example para rubber, also in combination with various types of fillers. Satisfactory results have not been obtained, either because of insufficient adhesion, or because or poor transparency (especially with heavy percentages of filler), or because of marks made by hot objects, or for other reasons. It should be noted that transparency of the non-slip layer is necessary to allow good visibility of the underlying design or decorative pattern. It should also be noted that, especially in the case (which is most frequent) of a coloured decorative design, the non-slip layer must not be subject to discolouration over a period of time, as is, however, the case with many of the materials hitherto tried.

It has now been found that the disadvantages indicated hereabove can be overcome in a really excellent manner by using for the non-slip layer a material of particular composition in combination with a well specified method of operation when manufacturing the laminated article.

Therefore, the object of the invention is a process for the manufacture of an article of laminated plastics having improved surface characteristics, characterised by the following operations:

(A) — forming on a temporary flexible support of a vulcanisable cohesive layer, adhering to the support, constituted essentially by an intimate mixture of 100 parts by weight of crude chlorosulphonated polyethylene rubber with 3–50 parts by weight of heat - hardenable melamine resin and with a proportion of vulcaniser and accelerator required for the vulcanising of the rubber, the said layer being present in a quantity of 35 to 200 g/m$^2$ (preferably 60 to 140 g/m$^2$).

(B) — forming of a pack of:
(a) — a core for the laminate,
(b) — at least one sheet of heat-hardenable melamine impregnated board or fabric on one face of the core (a),
(c) — the said temporary support carrying the said vulcanisable layer, being in contact with the component (b);

(C) — Pressing the pack thus formed at 125°–155° C. at a compression pressure of 15–100 kg/m$^2$ for a time sufficient to simultaneously vulcanise the rubber, harden the resin and combine the components (a), (b) and (c) into a monolithic laminated structure; and (D) — removal of the temporary support from the said monolithic structure.

Stage (A)

The fundamental material for this stage is chlorosulphonated polyethylene for example HYPALON 20 made by E. I. Du Pont de Nemours & Co. Inc.

As is known, polyethylene chlorosulphonate is a polymer of rubber-like consistency, easily soluble and dispersable in many organic solvents such as, for example, toluene, xylene, tetralin, turpentine, Solvesso 100, and many others. The preferred solvent for the purpose of the present invention is toluene. The polymer is vulcanisable by means of the use of numerous vulcanising agents and accelerators. As vulcanising agents the art normally uses oxides and salts of polyvalent metals, in particular, lead oxide (litharge), the tribasic lead salt of maleic acid, and magnesium oxide. According to the prior art the magnesium oxide would be the least suitable, inasmuch as during the vulcanising it would give rise to the formation of magnesium chloride which, being water-soluble, would confer upon the vulcanised product a certain sensitivity to water. This notwithstanding, for the purpose of the invention the magnesium oxide is perfectly suitable, preferably in association with zinc oxide. According to the invention, the preferred vulcanisation system comprises 5 parts by weight of each of these two oxides per 100 parts by weight of polymer. As aids to the vulcanisation the prior art used organic acids; for the purpose of the present invention such aids are not necessary and, instead, it is preferable to avoid their use. With regard to the accelerators the prior art suggests various products, such as, for example, tetraethylthiuram trisulphate (Thiuram E), 2-mercaptoimidazoline (NA 22) the tetrasulphate of pentamethylene thiuram (Tetrone A), di-ortho-tolyl-guanidine (DOTG), benzthiazyl disulphate (MTBS) and many others. For the purpose of the invention the preferred accelerator is NA, 22, in a ratio of about 1.5 parts by weight to 100 parts of polymer.

The crude polyethylene chlorosulphonate is tacky, and it is also so in the vulcanised state, although to a lesser degree. By adding to the polymer at least 3 parts by weight of a heat-hardening melamine/formaldehyde resin (of the commerical type, in powder form), the tackiness of the vulcanised product disappears, whereas, however, the surface of the vulcanised product acquires remarkable non-slip properties and becomes "warm" to the touch. When the proportion of melamine type resin exceeds about 15 parts by weight, the non-slip properties gradually diminish, whilst the "warm feel" persists, this being a very desirable property for many applications of laminated plastics. With amounts of resin exceeding about 50 parts by weight the above described properties are considerably diminished.

In practice, 100 parts by weight of sulphonated polyethylene are ground (for example, on a two-cylinder machine) with 5 parts by weight of MgO, 5 parts by weight of ZnO, and 1.5 parts by weight of NA 22, maintaining the temperature at just about under 40° C. so as to prevent vulcanisation at this stage of the process. Because the mass of material is "tacky" it is advantageous to add, according to the invention, up to 8 percent by weight (preferably 6–8 parts by weight) of low density polyethylene in fine powder form. Low density polyethylene is a material which has been known for decades and is described, for example, by R. B. Staub and R. J. Turbett at pages 78–82 of Modern Plastics Encyclopedia International 1973-1974, therefore any further reference to it in this context is superfluous. The grinding must be carried out until one reaches the point of homogeneity, providing finally a thin sheet, preferably of a thickness of less than 1 mm.

Apart from this one prepares a separate dispersion of the melamine resin in a solvent for the rubber-like polymer, preferably toluene. Simply, in a helical mixer one loads an average of 3 kg of toluene for every Kg of rubber-like polymer used in the aforementioned grinding stage, and one adds the required amount of resin in powder form, for example 15 Kg of resin for every 100 Kg of rubber-like polymer. Finally, one adds the ground product in the form of thin sheet, preferably cut into pieces, and one continues the mixing, keeping the temperature at lesss than 40° C., until one obtains a fluid homogeneous cream. Obviously, the amount of solvent is not critical and is adjusted in such a manner that the consistency of the cream is suitable for the machine subsequently used for spreading the cream on the temporary support. The 3 Kg of solvent first suggested are suitable for an applicator with an expandable blade.

As a temporary support one preferably uses silicone coated paper (so-called "release paper"), commercially available in rolls. There are available various types of silicone-coated papers. For the purpose of the invention we recommend that the temporary support having the active face should be "texturised" instead of smooth or shiny. Thus, of the silicone-coated papers, those which are preferable present an active face having the fibrous structure of the paper itself, which will then be reproduced on the final laminate. Eventually one could also use embossed silicone-coated papers, for example, those whose active face has (in negative) the texture of a natural hide or of a fine weft fabric. Silicone-coated papers of this type have been described, for example, in Modern Plastics, Nov. 1963, pages 84–86 and 181–184.

As a temporary support one could also use a thin metal sheet with a sandblasted or chemically engraved active face.

The aforementioned cream is applied to the active face of the temporary support by any suitable means, capable of producing a coating layer of uniform thickness, corresponding to an amount of cream (as dry content) of 35 to 200 g/m$^2$. Amounts greater than 200 g/m$^2$ do not improve the final result. In practical terms, using an expandable blade applicator, the typical adjustment of the blade corresponds to a thickness of the layer of cream of (for example) 0.2 to 0.6 mm. After the coating, one proceeds with the drying of the layer, preferably in an oven at a temperature which does not exceed 70° C. and with a possibly short dwell time in the oven, not exceeding 6–8 minutes at 70° C. This is easily obtainable in a hot-air oven; the solvent removed by the air can be recovered by means of partial condensation.

It is evident that both the coating of the temporary support and the drying can be effected advantageously by the continuous process, by making the strip of silicone-coated paper pass first through the coating apparatus and thereafter through a tunnel oven or the like. Subsequently, one obtains from the dried strip, by means of cutting or punching, sheets of form and dimensions suitable for the laminate article which one wishes to obtain.

Stage (B)

A first element used in this stage is the core for the laminate. According to the invention, the core may first be preformed, or preferably may be formed directly in stage (B) from a pack of sheets of paper or fabric impregnated with a heat-hardenable resin (generally, phenolic or melamine).

Amongst the preformed cores, those particularly suitable are ligneous panels known as "supported" and as "chip board." A "supported panel," commerically known as "Faesite" or "Masonite," is obtained by pressing wood fibres, usually mixed with a heat-hardenable binder (a phenolic or urea resin). A chip-board panel is obtained in a similar manner, but using wood particles, generally in the form of chips or shavings, instead of fibres, whereby the "chip board" is generally more porous than the "fibre board." These panels are no longer heat-formable and, therefore, they can only be used according to the present invention, for the manufacture of laminated plastics articles of flat configuration (for example, panels, for covering walls or for the manufacture of furniture).

For the manufacture of a tray according to the present invention, the core is formed in stage (B) by a convenient number of sheets of paper, for example, Kraft paper, impregnated with a heat-hardenable resin, perfectly similar to the conventional processes of manufacturing plastics laminates. The resin is preferably a phenolic or melamine resin, but can also be an urea resin. For example, in order to manufacture a tray of a thickness of about 3 mm, the core can be formed by superimposing, one on top of the other, 15 sheets of Kraft paper impregnated with phenolic resin. One thus obtains the component (a) for stage (B).

With regard to component (b), its technical function is that of binding together the components (a) and (c); also in most cases, this also serves a decorative function.

As a more typical case, the component (b) is formed by a single sheet of melamine-impregnated decorative paper, entirely analogous to the decorative papers used in conventional plastics laminates. However, instead of using decorative paper one may clearly use a decorative fabric. In this case, the core is preferably formed of a supported panel or by the pack of resin-impregnated sheets as described hereabove. The decorative paper may have a substance of 60 to 200 g/m² and the proportion of impregnating melamine resin can amount to 45–80% respectively to the dry weight of the impregnated paper (paper + resin). The percentages situated in the higher bracket earlier indicated are particularly suitable for a core formed by a supported panel.

For a core formed of chip board, which would tend to absorb a considerable quantity of resin in the hot pressing, stage (C), the component (b) preferably comprises the so-called "overlay," which is a light paper (25–35 g/m²) of pure cellulose, impregnated with 65–75% of melamine resin. The overlay does not have a decorative function and allows the design or the fibre of the nucleus to be seen in the finished article. In some cases this fact may be of no importance. However, even if the decorative aspect is important, the component (b) must comprise either the overlay disposed in direct contact with the core, or the sheet of decorative paper impregnated with melamine (or melamine impregnated decorative fabric) interposed between the overlay and the component (c). Obviously, in every case, the decorative face of this sheet is turned towards the outside, that is, towards the component (c).

For the sake of completeness one could also add, that the thickness of the core is also selected in dependence upon the application of the finished article of laminated plastics. The minimum thickness can be of the order of 1 mm, for articles of small dimensions or for flat laminates which in use are stuck onto a carrying surface (for example the surface of a table or bench). The maximum thickness generally does not exceed 15–20 mm and derives mainly from the use of a chip board panel.

Stage C

In this stage all the components of the pack of stage (B) are combined into a monolithic structure thanks to the simultaneous vulcanisation of the rubber-like polymer of the component (c) and the fusion, followed by hardening, of all the heat-hardenable resins present in the pack. Furthermore, when the core is formed by the superimposition of individual sheets of paper impregnated with heat-hardenable resin, the configuration of the moulds used in the pressing stage (C) determines the shape of the articles one wishes to obtain. Therefore, the moulds must be flat when the article is a flat sheet of plastics laminate. Otherwise, for example, when manufacturing a tray, the faces of the moulds must be suitably profiled for the shape of the tray.

When the core is formed by a pack of individual sheets impregnated with resin, the moulding pressure must be relatively high, preferably, of 60–100 Kg/cm². In the case of a core constituted by a supported panel the suitable pressure is about 30 to about 50 Kg/cm². In the case of a core formed of a chip board panel the pressure must be relatively low, from 15–25 Kg/cm², so as to prevent any substantial escape of the fused resin from the component (b) into the pores of the panel. The pressing time generally amounts to at least 3 minutes. However, relatively long pressing time do not cause damage. In an experimental test the pressing was effected at 150° C. for a time as long as 3 hours, without adverse consequences.

Stage (D)

In this stage, the temporary support is removed, leaving exposed the non-slip surface. The exposed face of this layer has the texture corresponding to that of the textured face of the temporary support used.

Figure 2:
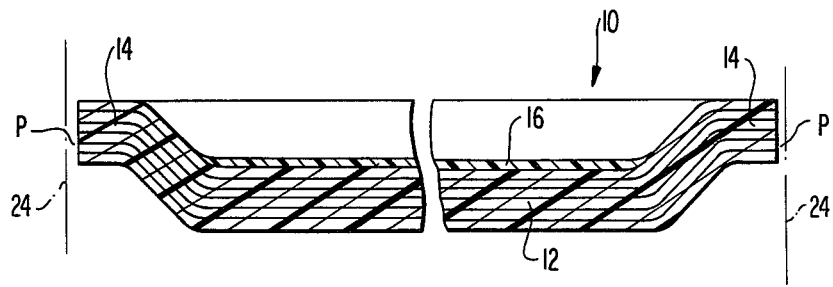

In the appended drawings;

FIG. 1 illustrates in an exploded vertical section one form of embodiment of the invention in relation to a tray, whereas FIG. 2 is a vertical section of the tray obtained.

The thicknesses of the various sheets have been exaggerated for the sake of the clarity of the drawing.

The tray 10 is a monolithic article of laminated plastics and comprises a bottom 12 lowered with respect to the perimeter edge 14. One can assume that the tray is of rectangular shape, with rounded corners, having dimensions of about 30 × 40 cm, and that the dimensions of the bottom itself (measured on the upper face of the tray) are 20 × 30 cm. It is required that both the faces of the tray present a decorative design, and that the upper face of the bottom should be provided with a transparent non-slip layer 16.

In FIG. 1, 20 and 22 respectively indicate male and female moulds, of a shape respectively complementary to the upper and lower face of the tray. In the drawing two chain-link lines 24 are traced which start from opposite edges of the male mould 20 and extend towards the lower part down to the level of the tray illustrated in FIG. 2, for the purpose of indicating, at a glance, that the perimetral zone 26 of the mould 20 corresponding to the perimeter edge 14 of the tray projects towards the outside with respect to the latter by an amount P (FIG. 2) which can be for example about 1 cm.

The core (a) of the tray is composed of 15 sheets of Kraft paper of 160 g/m² impregnated with a phenolic resin in a ratio of 150 g/m². The sheets are rectangular, of dimensions of about 35 × 45 cm, and are freely superimposed one on the other to form a pack.

On the core (a) there is superimposed a sheet (b) of cellulose decorative paper of a weight of 100 g/m², impregnated with melamine resin in a ratio of 150 g/m². The dimensions of the sheet (b) are identical to those of the sheets of the core (a). A sheet (b') identical to the sheet (b) is disposed beneath the core (a) to confer a decorative design to the lower face of the tray. Obviously, the decorated face of the upper sheet (b) is turned upwardly, whereas the decorated face of the lower sheet (b') is turned downwardly.

Finally, on the sheet (b) one superimposes the component (c), formed of a sheet 28 of silicone-coated paper of a thickness of about 0.05 mm, the active face of which presents its natural fibrous texture. This active face is provided with a coating layer 16, of a weight of 120 g/m², composed of 100 parts by weight of polyethylene chlorosulphonate (Hypalon 20), 15 parts by weight of melamine/formaldehyde resin, 6 parts by weight of low density polyethylene, 5 parts by weight of MgO, 5 parts by weight of ZnO, and 1.5 parts by weight of NA 22. The layer 16 is turned towards the decorative paper (b). The dimensions and the shape of the sheet (28) of silicone-coated paper with its coating 16 correspond to the dimensions and shape of the upper face of the bottom 12 of the tray. It is intended that the component (c) be superimposed on the pack (b) + (a) + (b') in a centred position.

The complete pack thus made up is placed in the female mould 22 and pressed by the male mould 20 with a pressure of 100 Kg/cm² at 150° C. After 3 minutes the mould 20 is lifted and the rough moulded part is transferred to an air cooling chamber. After cooling, all the perimetral zone of the moulded piece projecting from the perimeter edge 14 is cut-away and finally one removes from the article the silicone-coated paper sheet 28, which leaves on the top face of the bottom 12 the non-slip layer 16.

The non-slip layer 16 thus obtained is transparent; to the touch, the layer 16 is "warm" and seems velvety. Its union with the bottom 12 is practically indestructable. The tray 10 can be washed in very hot water (90° C. and over) and steam sterilized without in any way impairing the integrity of the layer 16. No discolouring occurs. A glass vessel placed on the layer 16 of the tray does not slip even if the tray is inclined at 45° with respect to the horizontal. If the glass vessel is pushed in this latter position, the glass stops moving after very few centimeters, which proves that the layer 16 presents excellent braking qualities.

In respect of this, it should be noted that the advantageous properties hereabove described are due, amongst other reasons, to the substantial absence, in the composition of the layer 16, of mineral fillers and plasticisers. Because for the purpose of the invention, these ingredients are not necessary or useful, their presence should in every case preferably be avoided.

I claim:

1. A process for the manufacture of an article made of laminated plastics having improved surface characteristics, comprising the steps of:
    (A) forming on a temporary flexible support, of a vulcanisable coating, cohesive and adhering to the support, constituted essentially by an intimate mixture of 100 parts by weight of crude polyethylene chlorosulphonate rubber with a 3–50 parts by weight of heat-hardenable melamine resin and with a proportion of a vulcanising agent and accelerator required for the vulcanisation of the rubber, the said layer being present in a quantity of 35 to 200 g/m²;
    (B) forming of a pack of:
        (a) a core for the laminate,
        (b) at least one sheet of melamine impregnated paper or melamine impregnated fabric, heat-hardenable on one face of the core (a),
        (c) the said temporary support with the said vulcanisable layer being in contact with the component (b);
    (C) pressing of the pack thus formed at 125°–155° C. under a compression pressure of 15–100 Kg/cm² for a time sufficient to simultaneously vulcanise the rubber, harden the resin and combine the components (a), (b) and (c) into a monolithic laminated structure; and
    (D) removal of the temporary support from the said monolithic structure.

2. A process according to claim 1, in which the proportion of melamine resin is 5–15 percent by weight.

3. A process according to claim 1, in which the face of the temporary support carrying the said vulcanisable layer is texturised.

4. A process according to claim 1, in which the temporary support is formed by silicone-coated paper of which the face which supports the said vulcanisable layer has the fibrous structure of the paper itself.

5. A process according to claim 1, in which the temporary support is formed of a silicone-coated sheet of paper of which the surface which supports the said vulcanisable layer is embossed.

6. A process according to claim 1, in which the component (a) is formed by a pack of individual sheets impregnated with a heat-hardenable synthetic resin, and in which this latter pack is consolidated by means of the heat-hardening of its resin in the pressing stage (C) effected under a pressure of 60–100 Kg/cm².

7. A process according to claim 1, in which the component (a) is composed of a "supported board" and the pressure exerted is of 30–50 Kg/cm².

8. A process according to claim 1, in which the component (a) is formed by a chip-board and the pressure is exerted with a pressure of 15–25 Kg/cm².

9. A process according to claim 1, in which the component (b) comprises in contact with the component (c), a sheet of decorated cellulose paper impregnated with melamine heat hardenable resin, the proportion of resin in this sheet being of 45–80% by dry weight of the impregnated paper.

10. A process according to claim 1, in which the component (b) comprises an "overlay" sheet in contact with the component (a).

11. A process according to claim 1, in which the component (b) is constituted by:
    (d) A sheet of decorative cellulose paper impregnated with heat-hardenable melamine resin in a proportion of 45 to 80% respectively of the dry weight of impregnated paper, the said sheet being in contact with the component (c), and, (e) an "overlay" sheet in contact with the components (a) and (d), and in which the component (a) is formed by a chip-board and the pressure is exerted with a pressure of 15–25Kg/cm².

* * * * *